June 8, 1926.  1,587,586
H. HOLLIS ET AL
HEATED STEERING WHEEL
Filed Oct. 21, 1925  2 Sheets-Sheet
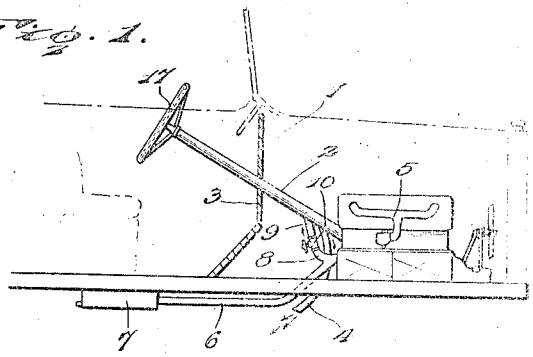
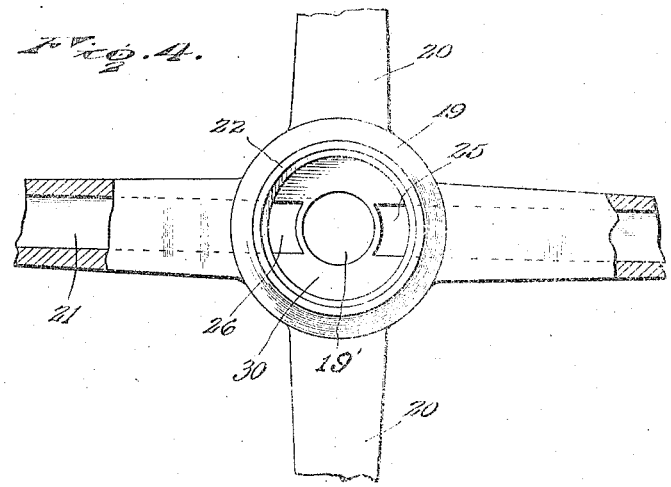
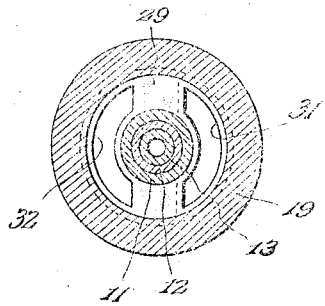
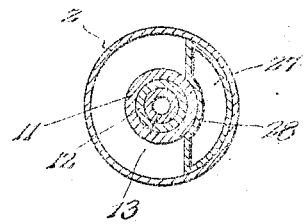
Inventors
H. Hollis.
C. B. Jonas.
By Lacy & Lacy, Attorneys June 8, 1926.
H. HOLLIS ET AL
HEATED STEERING WHEEL
Filed Oct. 21, 1925
1,587,586
2 Sheets-Sheet 1
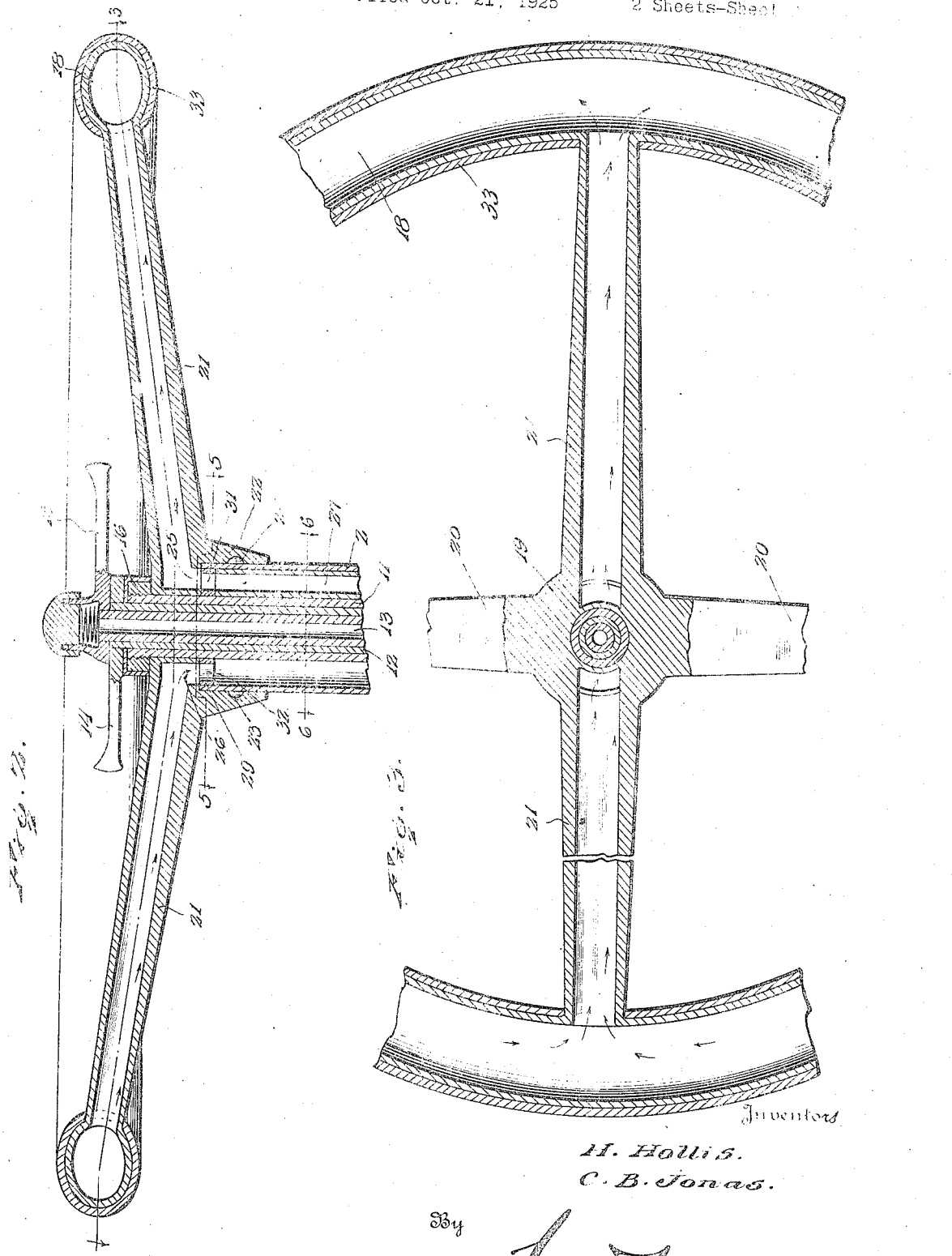
Inventors
H. Hollis.
C. B. Jonas.
By
Lacey & Lacey, Attorneys Patented June 8, 1926.

1,587,586

UNITED STATES PATENT OFFICE.

HOMER HOLLIS AND CLARENCE B. JONAS, OF OKLAHOMA CITY, OKLAHOMA.

HEATED STEERING WHEEL.

Application filed October 21, 1925. Serial No. 63,942.

This invention relates to a steering apparatus and more particularly to an improved post and wheel construction and one object of the invention is to so form the post and wheel that a portion of the exhaust gases from an internal combustion engine may be led from the exhaust pipe and caused to pass through the post and wheel so that the wheel will be heated and thereby prevent the hands of the driver of an automobile or other motor propelled vehicle from becoming numb. It often happens that the driver's hands will become numb during cold weather and this is not only disagreeable to the driver but is liable to cause accidents as the driver cannot as readily operate the steering wheel when his hands have become numbed.

Another object of the invention is to permit the hot gases from the exhaust pipe to be led through the steering post by means of a pipe extending longitudinally through it and delivered to the wheel and after circulating through the wheel returned to the steering post down which they will move and pass through a discharge pipe leading from the lower end portion of the steering post.

Another object of the invention is to provide the steering wheel with a hub so constructed that unless the wheel is turned beyond an ordinary amount the flow of hot gases through the spokes of the wheel to the hollow rim thereof will not be interfered with.

Another object of the invention is to permit the flow of hot gases to the wheel to be controlled by means of a valve located in a branch pipe leading from the exhaust pipe of the motor and communicating with the lower end of the supply pipe disposed longitudinally in the steering post.

This invention is illustrated in the accompanying drawings, wherein—

Figure 1 is a view in side elevation showing a portion of an automobile provided with the improved heated steering apparatus;

Fig. 2 is an enlarged sectional view taken diametrically through the steering wheel and upper portion of the post;

Fig. 3 is a horizontal sectional view taken on the line 3—3 of Fig. 2;

Fig. 4 is a fragmentary view of the wheel showing the hub portion thereof in bottom plan, and Figs. 5 and 6 are transverse sectional views taken respectively on the lines 5—5 and 6—6 of Fig. 2.

The improved steering apparatus has been shown applied to an automobile which is indicated in general by the numeral 1 but it will be understood that it could be applied to a motor boat if so desired. The steering post 2 which is of a tubular formation extends rearwardly through the dash-board 3 of the automobile in the usual manner and adjacent its lower end is provided with an outlet pipe 4 which extends downwardly through the bottom of the automobile and is curved to extend rearwardly so that, when the automobile is moving forwardly, the air draft created will not have a tendency to enter the lower end of the pipe 4 and prevent gases from passing out of this pipe. The motor 5 is of a conventional internal combustion engine construction and provided with the usual exhaust pipe 6 which leads to a muffler 7. This pipe is, however, formed with a branch 8 adjacent its forward end, and the branch pipe 8 is connected with a pipe 9 leading from the lower end portion of the steering post by means of a valve 10. The valve not only serves as means for connecting the pipe 9 with the branch pipe 8 but also permits control of the flow of hot gases through the pipe 9 into the steering post. It will, therefore, be seen that in warm weather the valve can be closed so that the steering wheel will not be heated.

The steering shaft 11 which passes through the post 2 is tubular and has its upper end portion projecting from the upper end of the post for engagement by the steering wheel. Within the shaft 11 are located the control shafts 12 and 13 for the spark and fuel supply, these shafts 12 and 13 also being tubular and fitting one within the other, as shown in Fig. 2. The shafts 12 and 13 extend from the upper end of the shaft 11 and are provided with the usual actuating levers 14 and 15 which are put in place after the securing nut 16 which holds the steering wheel in place has been tightened as much as necessary. It will, therefore, be seen that the spark and fuel controls may be mounted in the steering shaft in the usual manner with their actuating levers disposed above the steering wheel.

The steering wheel which is indicated in general by the numeral 17 in Fig. 1 is provided with a hollow rim 18 and with a hub 19 from which extend spokes 20 and 21 to connect the rim with the hub. The wheel may, of course, be of any size desired and provided with a suitable number of spokes 20, but the spokes 21 should be disposed in opposed relation to each other, as shown in Fig. 3, as these spokes are hollow and constitute conduits through which the hot gases will pass when circulating through the wheel. The hub 19 is formed with a depending annular flange 22 which fits snugly about the upper end portion of the steering post 2 and is formed with an annular groove 23 to receive a packing 24 so that the leakage of gases about the upper end portion of the steering post will be prevented. Passages 25 and 26 are formed in the hub 19 at opposite sides of the opening 19′ through which the steering shaft passes and communicate with the hollow spokes, as shown in Fig. 2, so that the gases passing upwardly through the steering post may enter one of the spokes 21 and after passing through this spoke to the rim circulate through the rim and enter the other spoke 21 through which they will move to the steering post and pass downwardly through the post and out through the outlet pipe 4 to the atmosphere. It is necessary to prevent the gases passing upwardly through the steering post from becoming mixed with those passing downwardly therein. In order to do so there has been provided a pipe 27 which extends longitudinally in the steering post and has its lower end communicating with the inlet pipe 9. The pipe 27 is arcuate in cross section, as shown in Fig. 6, with its outer wall in snug engagement with the wall of the steering post and has its inner wall formed intermediate its width with an arcuate portion 28 for snug engagement with the steering shaft 11. The upper end of the pipe 27 terminates in spaced relation to the upper end of the post 2, as shown in Fig. 2, and contacts with the under face of a disk 29 which fits snugly in the steering post about the steering shaft and forms a head for the upper end of the steering post and also serves as a bushing for the steering shaft. The head or bushing has its upper face in close contacting engagement with the face 30 at the inner end of the post receiving socket formed by the flange 22 of the hub 19 and is formed with arcuate circumferentially extending slots 31 and 32. The slots 31 and 32 conform to the size and shape of the pipe 27 in cross section as can be readily seen by comparing Fig. 5 with Fig. 6 so that, when the head is in place, the opening or slot 31 will accurately register with the pipe 27. The passages 25 and 26 of the hub register with these slots except when the wheel is turned out of the normal driving position to such an extent that the passages are disposed above the unslotted portions of the head at the front and rear of the steering shaft. It will, therefore, be seen that practically at all times the passages 25 and 26 will be in registry with the slots 31 and 32 so that the hot gases from the exhaust pipe may pass upwardly through the pipe 27 into one of the hollow spokes 21 and then after circulating through the rim enter the other hollow spoke and pass through it and downwardly through the steering post to the outlet pipe. If a very sharp turn is to be made, the wheel will be turned more than the usual extent but the circulation of the hot gases through the steering wheel will not be interfered with as the passage 26 will be moved into registry with the opening 31. The steering wheel is preferably formed of aluminum, although any suitable material may be used and the rim may be provided with a heat-insulating covering 33 so that danger of burning the hands from contact with the hot rim will be eliminated.

Having thus described the invention, we claim:

1. In a steering apparatus, a tubular post constituting a conduit for a heating medium and provided with an outlet, a steering shaft extending through said post, a head at the upper end of said post disposed about said shaft and formed with passages at opposite sides of the shaft, one of said passages communicating with the interior of said post, a conduit for the heating medium having its upper end registering with the other passage of said head, and a steering wheel including a hub rotatably fitted upon the upper end of said post and secured to said shaft and formed with circumferentially spaced passages to register with the passages of said head, a hollow rim, and spokes connecting the rim with said hub, certain of said spokes being hollow and communicating with the hollow rim and passages of said hub.

2. In a steering apparatus, a tubular post, an outlet pipe leading therefrom, a supply pipe leading to said post, a steering shaft extending axially through the post and projecting from the upper end thereof, a head for the upper end of said post having snug engagement with the shaft and walls of the post and formed with circumferentially extending slots at opposite sides of the shaft, a conduit extending longitudinally in said post with its lower end communicating with said supply pipe and its upper end registering with one of the slots in said head, and a steering wheel including a hub secured upon the projecting upper end of said shaft and formed with a depending annular flange fitting snugly about the upper end portion of said post, a hollow rim, and spokes connecting said rim with said hub, certain of said spokes being in alinement with each other diametrically of the hub and formed hollow to provide conduits having their outer ends communicating with the hollow rim, said hub being formed at opposite sides of said shaft with passageways communicating with the inner ends of said hollow spokes and adapted to register with the slots in said head.

In testimony whereof we affix our signatures.

HOMER HOLLIS. [L. S.]
CLARENCE B. JONAS. [L. S.]